United States Patent [19]
Adell

[11] Patent Number: 5,113,175
[45] Date of Patent: May 12, 1992

[54] REAR MOTOR VEHICLE ALERTING BRIGHT LIGHT DIMMING SIGNAL AND CONTROL SYSTEM

[76] Inventor: Robert Adell, 31800 S. Brandingham, Franklin, Mich. 48025

[21] Appl. No.: 627,951

[22] Filed: Dec. 17, 1990

[51] Int. Cl.⁵ ............................................... B60Q 1/26
[52] U.S. Cl. .................... 340/468; 340/472; 340/457.2; 362/83.3
[58] Field of Search ............. 340/468, 469, 470, 471, 340/472, 457.2, 482; 362/83.3; 307/10.8

[56] References Cited

U.S. PATENT DOCUMENTS

| | | | |
|---|---|---|---|
| 2,400,655 | 5/1946 | Saia | 340/470 |
| 2,878,462 | 3/1959 | Tralli | 340/468 |
| 3,192,437 | 6/1965 | Meyer | 340/471 |
| 3,517,384 | 6/1970 | Jablonski | 340/468 |
| 3,678,457 | 7/1972 | Lev | 340/468 |
| 4,037,197 | 7/1977 | Courty | 340/468 |
| 4,859,988 | 8/1989 | Holtvluwer | 340/471 |
| 4,989,121 | 1/1991 | Hall | 340/468 |

Primary Examiner—Donnie L. Crosland

[57] ABSTRACT

A rear motor vehicle alerting bright light dimming signal and control system for alerting a driver of a vehicle behind a signalling vehicle to dim his bright lights. The signalling system is low in cost, improves vehicle safety, promotes driver courtesy and is adaptable to all motor vehicle styles and models. A control system permits the signalling system to operate only when the stop lights and turn signal lights of a signalling vehicle are inoperative. The signal system comprises one or more flashing lights mounted at the rear of a vehicle and a control circuit for operating the lights. In one aspect of the invention, a signalling light is mounted on a rear package tray in a common housing with an "eye level" stop light and, when operative, transmits a flashing high intensity beam of colored light to alert the driver of the rear vehicle. The control system has two states, a normally off state and an operating state wherein the signal light flashes for a predetermined time. In an alternate embodiment the signal lights are automatically activated by a bright light from a rear vehicle.

26 Claims, 6 Drawing Sheets

REAR MOTOR VEHICLE ALERTING BRIGHT LIGHT DIMMING SIGNAL AND CONTROL SYSTEM

BACKGROUND OF THE INVENTION

This invention relates to a vehicle signalling system and more particularly to a signalling and control system which enables a driver to alert drivers of vehicles behind his vehicle to dim or turn on their headlights.

It is not uncommon, on highways and in city traffic, for drivers to neglect to dim or turn on their headlights. Bright lights from headlights reflect off the side view and rear view mirrors of other vehicles into their drivers' eyes. The reflected lights are a source of tremendous annoyance and distraction and impair the ability of drivers to observe the road and control their vehicles. The applicant, along with others, has encountered the problems of bright headlights as well as drivers' failures to turn on their headlights.

At present, the only way a driver can signal a rear vehicle that its headlights are either "off" or on "high beam" is by rapidly switching his vehicle's lights on and off. This is extremely dangerous when driving on highways and freeways, especially at speeds of 55 miles per hour and above. The danger is greater during rain and snow because of reduced visibility and increased glare.

Vehicle manufacturers have responded to the "high beam" problem by equipping vehicles with "day and night" rear view mirrors. The mirrors reduce glare from bright headlights but substantially reduce night vision. Any reduction of vision at night is undesirable and can cause serious accidents, especially when vehicles travel at high speeds and change lanes Furthermore, the "day and night" mirror is not effective for reducing glare from reflections off side view mirrors of trucks which cannot be adjusted during driving and require wrenches for angular adjustments.

A failure to turn on headlights also affects vehicle safety. Failures to turn on headlights usually occur at sundown when some sunlight is still available to prevent a driver from being aware that his headlights have not been turned on. A failure to turn on headlights can also cause serious accidents, by way of example, "head on" collisions during lane changing.

Because of fierce competition among automobile manufacturers, controlling costs is of major concern and manufacturers are reluctant to make changes which add cost to their products. Manufacturers are also reluctant to make changes which increase their warranty costs and restrict the freedom of their designers to create original and competitive styling to stimulate sales. It is noteworthy that in an industry which is as competitive as the automotive industry, it is extremely rare to add new features at very low investment and manufacturing costs.

From the foregoing, it is apparent that a successful bright light signalling system will have to be low in cost, reliable and have little, if any, effect on vehicle styling.

SUMMARY OF THE INVENTION

The present invention satisfies the requirements of low cost, reliability and minimum effect on vehicle styling. The invention is an improvement over my earlier invention for a rear vehicle courtesy bright light dimming signal system which is disclosed in a pending U.S. application, Ser. No. 07/534,551. The improvement resides in the addition of a control system, which permits my signalling system to be operative only when the stop lights and turn signal lights of a vehicle are not operating, for alerting rear vehicles that their headlights are either "off" or on "high beam". The reason for restricting the operation of the signalling system is to avoid the possibility of confusion caused by a simultaneous operation of the stop lights, flashing turn signal lights, and flashing bright light signalling lights.

One benefit of the invention, in addition to the safety benefits, is that it can be immediately incorporated into new vehicle programs and/or installed in existing motor vehicles at mimimum installation effort and cost. Furthermore, as will be seen, the invention is adaptable to all vehicle types and styles including but not limited to, standard passenger sedans, convertibles, recreational vehicles, trailers, vans and trucks. Another important benefit is that manufacturing and investment costs for practicing the invention are very low.

In the first aspect of my invention a flashing colored light is mounted in an existing high mounted stop light housing and operated by a driver manual control. The control prevents the signalling light from operating if the signalling vehicle's stop lights or turn signal lights are operating. The signalling light is preferably a high intensity colored light, by way of example, green or blue. In a second aspect of the invention, an automatic control is provided which responds to a bright light from a rear vehicle.

Integrating the signalling light into an existing light housing offers a rare opportunity to provide a badly needed feature which provides safety, convenience and, last but not least driver courtesy, at very low investment and manufacturing costs. While an inventor cannot dictate to a vehicle manufacturer where to position the signalling light, it is suggested that it be positioned at the eye level of a driver in a rear vehicle or as close to eye level as possible.

The foregoing features, benefits and advantages, together with additional features, benefits and advantages, will become apparent from the ensuing detailed description of a preferred embodiment and the accompanying drawings. The best mode contemplated in practising the invention is disclosed and the subject matter in which exclusive property rights are claimed is set forth in each of the numbered claims at the conclusion of the detailed description.

DETAILED DESCRIPTION OF THE PREFERRED EMBODIMENT

Figure 1:
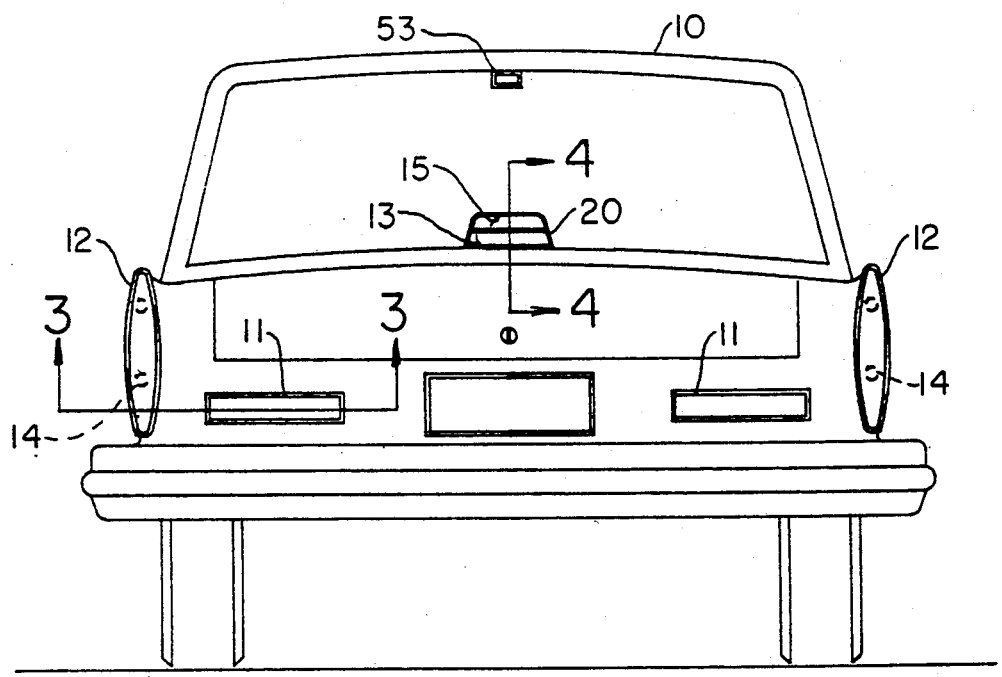
FIG. 1 is a rear view of a passenger vehicle which embodies my invention.
Figure 2:
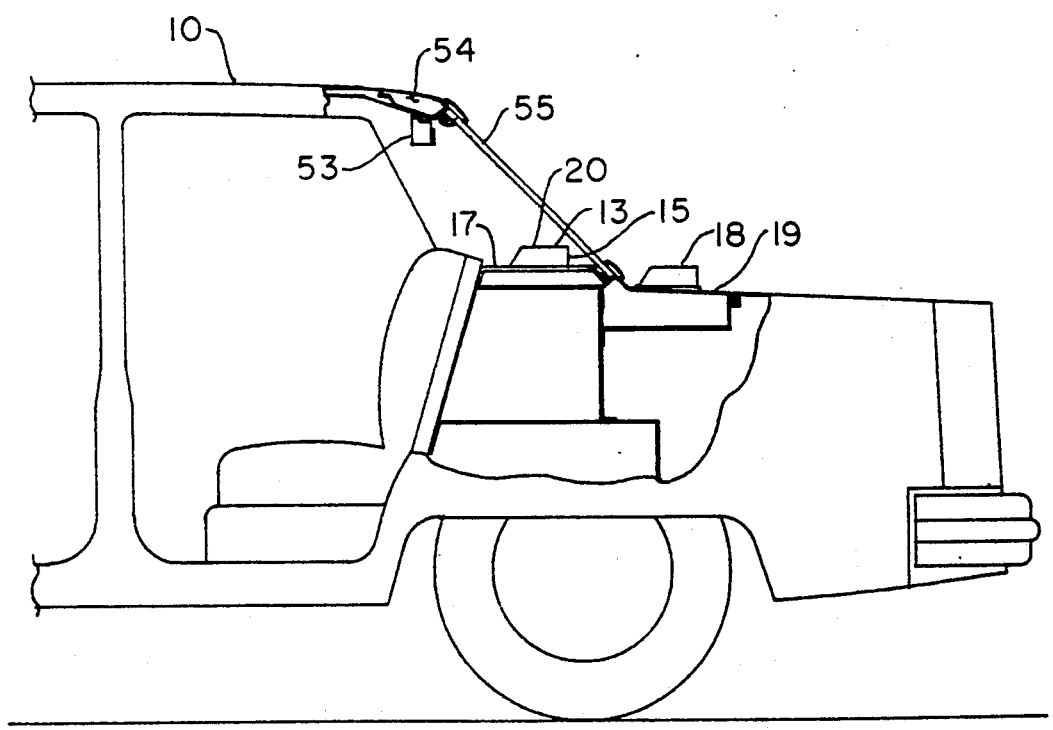
FIG. 2 is a partial left side view of the passenger vehicle of FIG. 1.

Referring now to the drawings wherein like numerals designate like and corresponding parts throughout the several views, in FIGS. 1 and 2 a typical passenger sedan 10 is shown which embodies my invention. It is to be understood that the sedan is shown for illustrative purposes only and that my invention is not limited to sedans but rather applies to all types and styles of motor vehicles, by way of example, sedans, convertibles, motor homes, recreational vehicles, trailers, vans, trucks, motorcycles and the like.

The sedan 10 has a pair of front mounted headlights (not shown), an interior headlight switch (not shown), a pair of rear mounted back-up lights 11, a pair of rear mounted tail/stop lights 12, and a rear mounted "eye level" stop light 13. The stop lights 14 of the tail/stop lights 12 also serve as rear turn signal lights and emergency signal lights and flash "on and off" when driver controls (not shown) are operated.

With reference to FIG. 2, a signalling light 15 is combined with the "eye level" stop light 13. The "eye level" stop light 13 is centrally mounted in the interior of the vehicle on a package tray 17. Also shown in FIG. 2 is an "eye level" stop light 18 for a convertible which is mounted on an exterior body panel 19 because of the unavailability of a package tray.

The "eye level" stop light 13 is in a desirable location to gain the attention of a driver operating a motor vehicle behind another motor vehicle because the "eye level" stop light 13 is easily seen by the driver of a rear vehicle and is remote from the other lights of the vehicle. Another benefit is that only a single signalling light 15 is needed.

Figure 4:
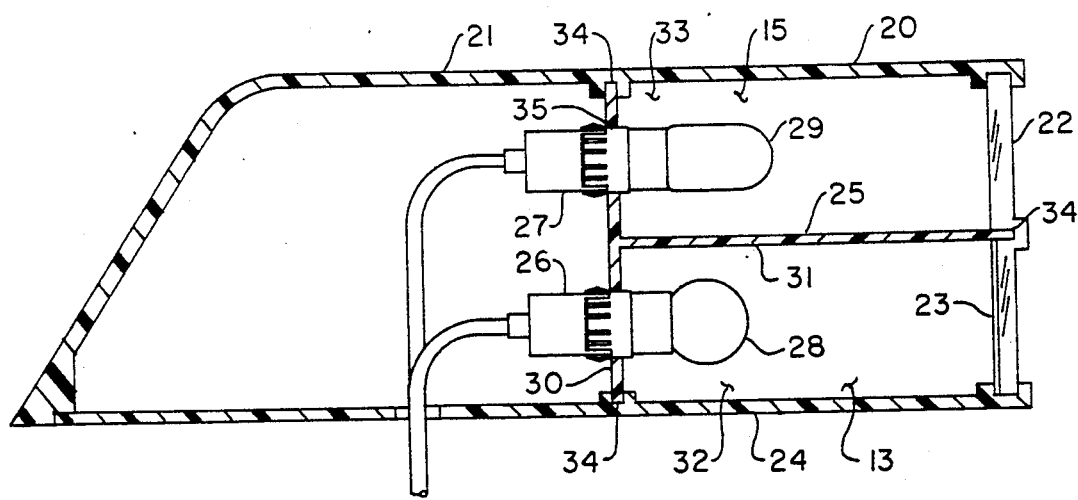
FIG. 4 is an enlarged cross-sectional view taken on the line 4—4 which shows an "eye level" stop light and a signalling light mounted in a common housing.

The construction of the combined "eye level" stop/-signalling light 20 is shown in FIG. 4. The stop/signalling light 20 has a generally rectangular housing 21 with open bottom and rear end portions. A clear lens 22 and red stop light lens 23 cover the open rear portion of the housing 21 and a base plate 24 covers the open bottom portion. The clear lens 22 and red stop light lens 23 have optics which are consistent with the standard design practices of the motor vehicle industry for exterior lighting.

Inside the housing 21 there is a T-shaped member 25, a stop light socket 26, a signalling light socket 27, a clear stop light bulb 28, and a signalling light bulb 29. The signalling light bulb 29 is preferably green, blue or some other color which is readily distinguishable from the vehicle's red and amber colored lights. The signalling light bulb 29 is preferably a high intensity bulb and is preferably regulated by a control system, which will be later described, to flash at a higher rate than the vehicle's turn signals. The higher flashing rate is desirable to gain the attention of the driver of the rear vehicle and to further distinguish the signalling light 15 from the vehicle's other lights. A colored lens may be used with a clear bulb in place of the colored signalling light bulb 29.

The T-member 25 has a vertical wall 30 and an intersecting horizontal wall 31 which partition the interior of the housing 21 into two compartments, a lower compartment 32 for the stop light bulb 28 and an upper compartment 33 for the signalling light bulb 29. The T-member 25 is located and retained in grooves 34 of the housing 21, base plate 24 and lens 22. In the vertical wall 30 of the T-member 25 are apertures 35 which receive the stop light socket 26 and the signalling light socket 27. The stop light socket 26 and signalling light socket 27 are conventional and retain the stop light bulb 28 and signalling light bulb 29, respectively.

Figure 5:
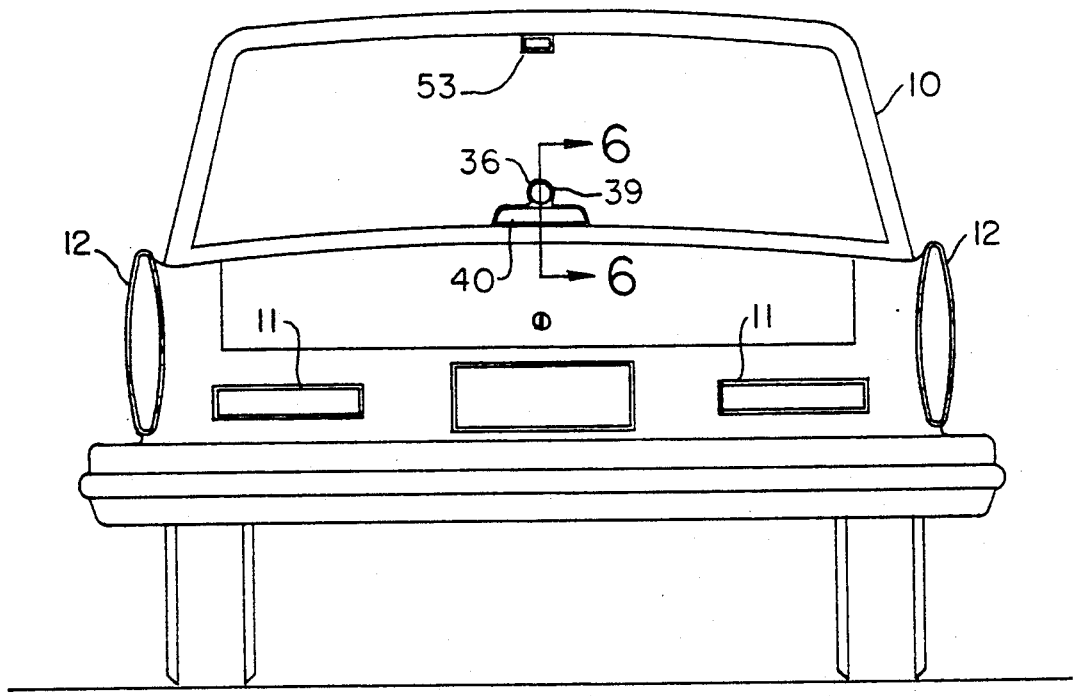
FIG. 5 is a rear view of a passenger vehicle which incorporates an alternate embodiment of my invention.
Figure 6:
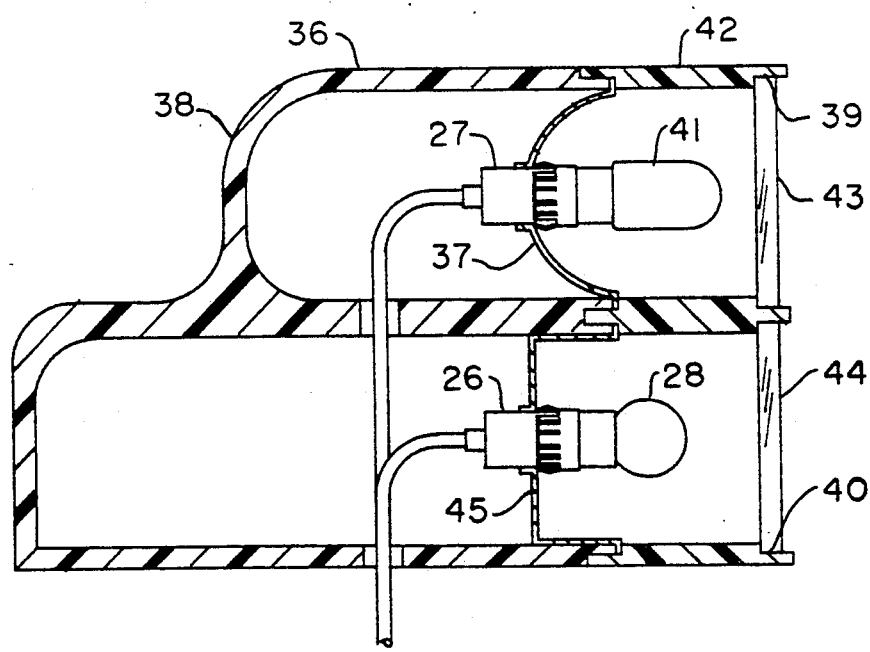
FIG. 6 is an enlarged cross-sectional view taken on the line 6—6 which shows an alternate embodiment of an "eye level" stop light and a signalling light mounted in a common housing.

With reference to FIGS. 5 and 6, an alternate embodiment 36 is shown having a parabolic reflector 37 which focuses the beam from the signalling light bulb 29 to produce a spot light effect. A housing 38 has a circular upper portion 39 for mounting a high intensity clear signalling light bulb 41 and an adjoining rectangular lower portion 40 for mounting a clear stop light bulb 28. The front portion of the housing 38 is open and is covered with a bezel 42 in which are mounted a green or blue circular signalling light lens 43 and a red rectangular stop light lens 44. In the interior of the housing 38 is a stop light reflector which carries the stop light socket 26 and the parabolic signalling light reflector 45 which carries the signalling light socket 27. The stop light reflector 45 and parabolic signalling light reflector 37 are retained by the bezel 42.

Figure 3:
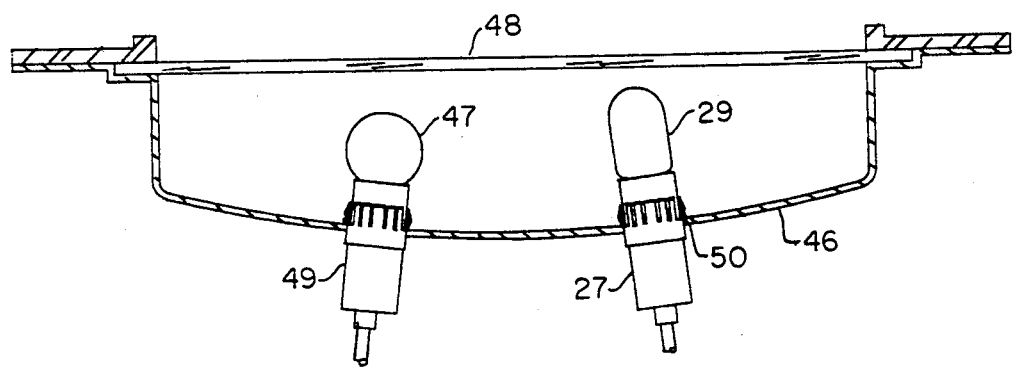
FIG. 3 is an enlarged cross-sectional view taken on the line 3—3 of FIG. 1 which shows a back-up light and a signalling light mounted in a common housing.

Although the "eye level" stop light 13 is a desirable location for my headlight dimming signalling light, there are other locations which may not be as desirable but are nevertheless suitable. By way of example, in FIG. 3 I have shown the colored signalling light bulb 29 mounted in the same housing 46 with a back-up light bulb 47. The pair of back-up lights 11 are suitable for mounting signalling light bulbs 29 for the following reasons.

One reason is that the back-up lights 11 operate only when the vehicle's transmission is in reverse whereas the signalling lights 15 operate only when the transmission is in a forward gear and the vehicle is travelling in a forward direction. Another reason is that the back-up lights 11 have clear or frosted lenses 48 which can be used for both the clear back-up light bulb 47 and the colored signalling light bulb 29. Other reasons are that the signalling light bulbs 29 can be added to the back-up light housings 46 without vehicle modifications or affecting vehicle styling.

Referring again to FIG. 3, each of the combined back-up/signalling lights includes the housing 46, a back-up light socket 49, a signalling light socket 27, the clear back-up light bulb 47, the colored signalling bulb 29, and the clear or frosted lens 48. One advantage of this embodiment is that separate compartments are not required for the clear back-up light bulb 47 and the colored signalling light bulb 29. Another advantage is that the signalling light sockets 27 can be added to the back-up lights 11 by merely adding an aperture 50 in each of the housings 46. The disadvantages of this location over the "eye level" stop light 13 location is that it is less remote from the vehicle's other lights and is not as easily seen by the driver of the rear vehicle.

Figure 7:
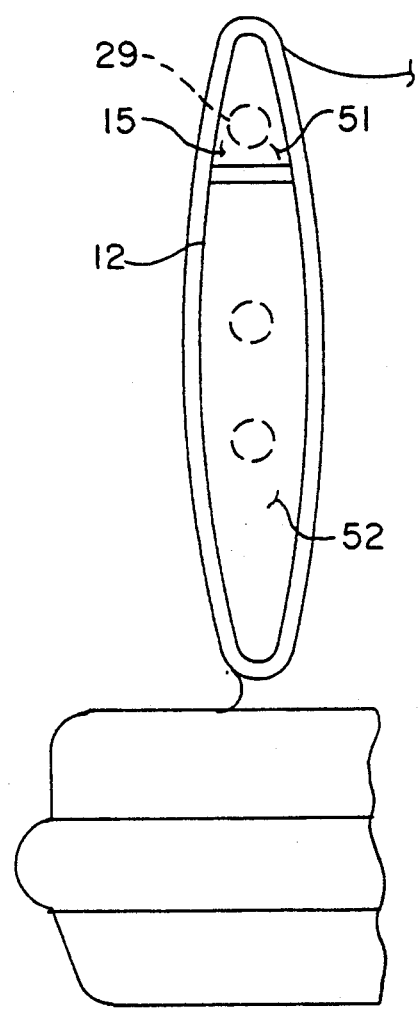
FIG. 7 is a partial view of the rear end of a passenger vehicle showing a tail/stop light and a signalling light mounted in a common housing.

In FIG. 7, I have illustrated another location for the signalling lights 15, i.e., the stop/tail lights 12. A signalling light bulb 29 may be mounted in the stop/tail lights 14 by partitioning them into a separate upper 51 and lower 52 compartment and mounting a signalling light socket 27 and bulb 29 in the upper compartment. In certain models, such as trailers and trucks, it may be a desirable alternative.

Referring now to FIGS. 1 and 2, inside of the vehicle 10, a photo cell unit 53 is mounted on a lateral structural body member 54 and projects downwardly into the upper portion of the rear window opening 55. The photocell unit 53 is part of an automatic control circuit which will be later described.

Figure 8:
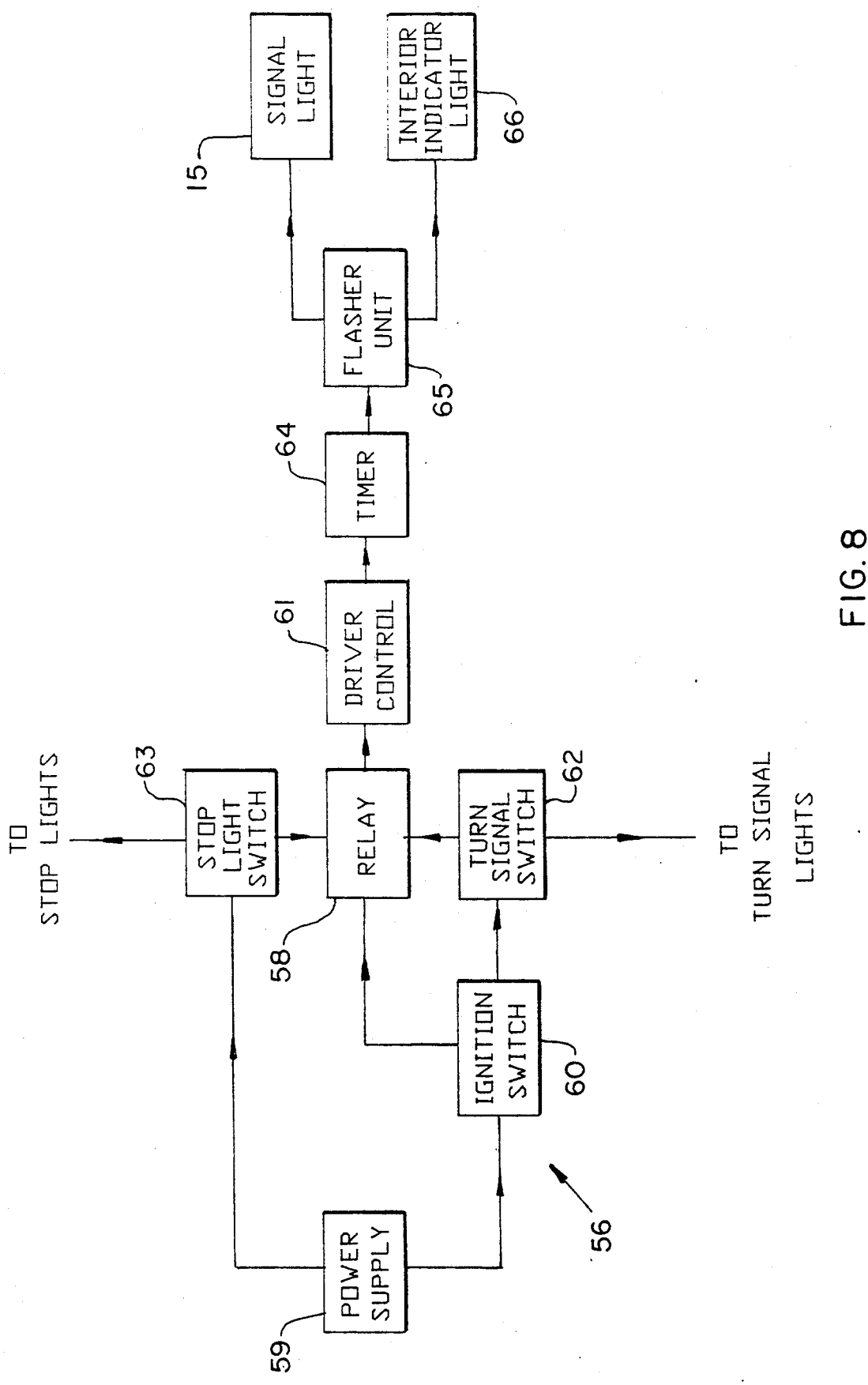
FIG. 8 is a schematic diagram of the circuit for manually controlling my headlight dimming signalling system.

A block diagram of a manual control system 56 for operating a single signal light 15 is shown in FIG. 8. One side of a normally closed relay 58 receives current from a vehicle's power supply 59 via the vehicle's ignition switch 60. A driver control 61, i.e. a normally open single pole-single throw switch (SPST) is connected in series with the ignition switch 59. The driver control 61 is readily accessible to a driver, by way of example, on an instrument panel, a driver's door trim panel or a steering column.

The driver control 61 is spring biased to return the control 61 to the normally open position to insure that the signalling light 15 will not be inadvertently left on after the control 61 is released by a driver. The other side of the relay 58 is connected to the vehicle's turn signal switch 62 and stop light switch 63 whereby if either the turn signals or stop lamps are operative, current to the signal light 15 will be interrupted by the relay. The driver control 61 supplies current to a timer 64 which is in series with a flasher 65 which in turn supplies current to the signal light 15. An optional interior indicator light 66 is shown to inform the driver when the signalling system is operating. Since the signalling system is operative only at night, the driver control 61 may optionally be connected in series with the vehicle's light switch (not shown), instead of the ignition switch 60.

The manual control 56 operates as follows. When the driver control 61 is momentarily closed and released by a driver and both the turn signals and stop lights are inoperative, current is supplied via the relay 58 and timer 64 to the flasher unit 65 for a predetermined time. If the driver control 61 is held in the operative position, the flasher 65 will continue to supply current to the signalling light 15 which will continue to flash until the control 61 is released.

Figure 9:
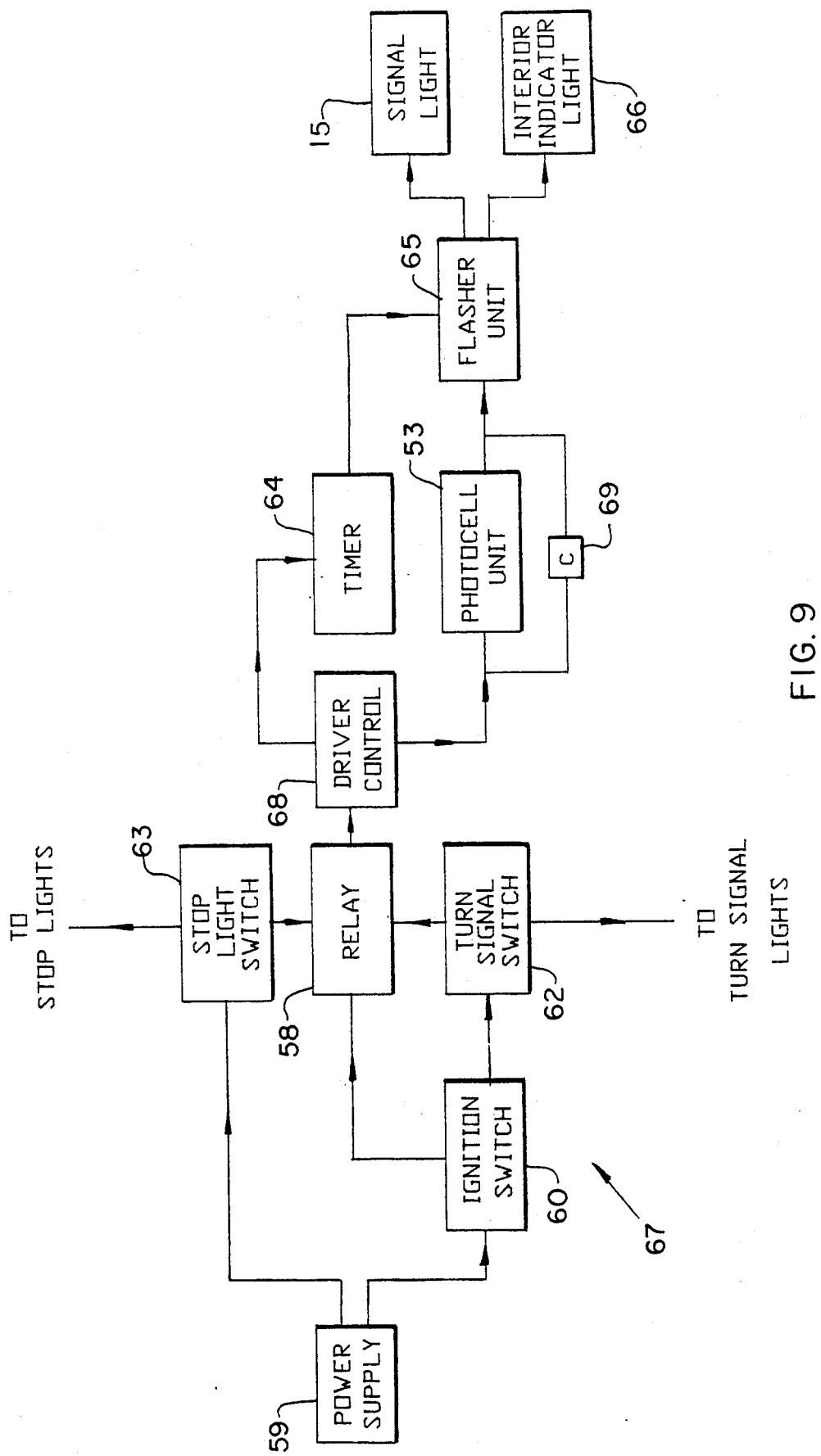
FIG. 9 is a schematic diagram of a circuit for automatically controlling my headlight dimming signalling system.

FIG. 9 is a block diagram of an automatic control 67 for operating a single signal light 15. One side of a normally closed relay 58 is connected in series with a vehicle's ignition switch 60. The other side of the relay 58 is connected to the vehicle's turn signal switch 62 and stop light switch 63. If both the turn signals and stop lights are inoperative, current is supplied via the vehicle's power supply 59, ignition switch 60, and relay 58 to a driver control 68. The driver control 68 is a single pole double throw (SPDT) with a normally open center position. One end of the control 68 is for manual operation and is spring biased to return the control 68 to the center "Off" position 66. At this position the control 68 operates as a manual control in the manner as previously described. The other end is for automatic operation and is not spring biased to return the control to the center "Off" position. The automatic end is connected to the photocell unit 53. When a strong light beam from a rear vehicle contacts the photocell 53, the photocell 53 becomes conductive and passes current to the flasher unit 65, causing the signal light 15, in series with the flasher unit 65, to flash. When the light beam ceases to contact the photocell 53, the photocell 53 becomes non-conductive and the signalling light 15 ceases to flash. A sensitivity control 69 is provided to adjust the level at which the photocell unit 53 will activate the signal light 15.

From the foregoing, it will be understood that my invention provides a low cost means of providing a badly needed safety feature in a motor vehicle. Moreover, this feature improves driver courtesy, can be immediately incorporated by motor vehicle manufacturers into new vehicles, and can be sold on the after market to retrofit existing vehicles.

Although but several embodiments of my invention have been illustrated and described, it is not my intent to limit my invention to these embodiments. It will be appreciated that after having the benefit of this disclosure, other embodiments can be developed by changes such as the substitution and re-arrangement of components without departing from the spirit thereof.

I claim:

1. In a motor vehicle of the type having headlights on the front of the vehicle and stop lights, tail lights, back-up lights and turn signalling lights on the rear of the vehicle, a system for signalling a driver of a vehicle behind another vehicle to dim his bright headlights comprising: at least one signalling light mounted on the rear of a vehicle, said light being adapted when operative to display a visual signal for requesting a driver who is operating a vehicle behind the signalling vehicle to dim his vehicle's bright headlights; a power supply for supplying electrical power to said signalling light; and a control circuit for controlling the operation of said signalling light, said control circuit including a means for preventing said signalling light from being operative when the stop lights or turn signal lights of said signalling vehicle are operative.

2. The headlight dimming signalling system described in claim 1 wherein said control system is adapted to flash said signalling light "on and off" when said light is operative.

3. The headlight dimming signalling system described in claim 1 further comprising a means inside of said signalling vehicle for informing the driver of the signalling vehicle that said signaling light is operative.

4. The headlight dimming signalling system described in claim 1 wherein said vehicle has an "eye level" stop light mounted inside of a housing and said signalling light is located in said "eye level" stop light housing.

5. The headlight dimming signalling system described in claim 1 wherein said vehicle has a pair of back-up lights mounted inside of separate housings and said signalling system has a pair of signalling lights, each of said lights being mounted in one of said back-up light housings.

6. The headlight dimming signalling system described in claim 1 wherein said vehicle has a combined tail light and stop light mounted in each of a pair of housings and said signalling system has a pair of signalling lights, each of which is mounted in one of said combined tail light and stop light housings.

7. The headlight dimming signalling system described in claim 1 wherein said vehicle has an "eye level" stop light mounted inside of a housing and a pair of back-up lights mounted inside of separate housings and said signalling system has three signalling lights, one of which is mounted in said "eye level" stop light housing and each of the other pair being mounted in one of said back-up light housings.

8. The headlight dimming signalling system described in claim 1 wherein said control system is a manual control system which is operated by the vehicle's driver.

9. The headlight signalling system described in claim 1 wherein said control system is an automatic control system which is responsive to a bright beam from another vehicle's headlights.

10. The vehicle headlight dimming signalling system described in claim 1 wherein said signalling system is operative only when an ignition switch of said signalling vehicle is closed.

11. The vehicle headlight dimming signalling system described in claim 1 wherein said system is operative only when said vehicle's headlights are operative.

12. The vehicle headlight dimming signalling system wherein said manual control system as described in claim B includes a driver operated switch, said switch having an inoperative state wherein said signalling light is continuously off, a first operating state for flashing said signalling light "on and off" for a predetermined time and a second operating state for flashing said signalling light "on and off" continuously.

13. The vehicle headlight dimming signalling system described in claim 9 wherein said automatic control system comprises a photocell unit which is responsive to a bright headlight beam from a vehicle behind the signalling vehicle.

14. In a motor vehicle of the type having headlights, stop lights, turn signal lights, back-up lights and tail lights, a system for alerting a driver of a vehicle behind another vehicle to dim his vehicle's bright lights comprising: a pair of signalling lights mounted at the rear of a vehicle, each of said lights being mounted in a housing which si common with a housing of a back-up light of said signalling vehicle; and a manual control, said control being operative to flash said signalling lights only when said vehicle's turn signals and stop lights are inoperative and having a driver operated switch for actuating said manual control for flashing said signalling lights "on and off", said driver operated switch having a first operative state for flashing said signalling lights for a predetermined time and a second operating state for flashing said signalling lights "on and off" continuously.

15. The headlights dimming signalling system described in claim 14 wherein said manual control is spring biased for returning said control system to an inoperative state when said driver operated switch is released.

16. In a motor vehicle of the type having a pair of headlights, stop lights, tail lights, turn signal lights an back-up lights, a system for requesting a driver of a vehicle behind a vehicle to dim his vehicle's bright lights comprising: a pair of lights mounted a the rear o a vehicle in common housings with said vehicle's back-up lights, said lights having an operative state only when said stop lights and back-up lights are inoperative wherein said lights flash "on and off" to alert a driver who is operating a vehicle behind the signalling vehicle to dim the headlights of the rear vehicle; and an indicator light inside of said vehicle for informing the driver of the signalling vehicle that his vehicle's signalling system is operative.

17. In a motor vehicle of the type having a pair of back-up lights mounted on the rear of the vehicle which are operative when said vehicle is travelling in a reverse direction, turn signal lights and stop lights, the improvement which comprises a means for flashing said back-up lights "on and off" when said vehicle is travelling in a forward direction to request a driver who is operating a vehicle behind the signalling vehicle to dim his vehicle's bright lights, said means being operative only when said signalling vehicle's stop lights and said turn signal lights are inoperative.

18. The headlight dimming signalling system described in claim 17 wherein said means for flashing said lights "on and off" comprises: a driver operated control in the interior of said signalling vehicle, said control having an inoperative state wherein said signalling light is continuously off, a first operating state wherein said signalling flashes "on and off" for a predetermined time, and a second operating state wherein said signalling light flashes "on and off" for a continuous period of time, said control being spring biased to return said control from said first operative state to said inoperative state when said control is released by said driver; a time delay operatively connected to said driver control for causing said lights to flash "on and off" for a predetermined time when said control is returned to said inoperative state; a flasher unit operatively connected to said time delay to cause said lights to flash when said control is released by said driver.

19. A motor vehicle headlight dimming signalling system for requesting a driver of a rear vehicle to dim his headlights comprising in combination: a housing mounted on the rear of a first vehicle having a first compartment, a bulb mounted in said first compartment for informing a driver of a vehicle behind said first vehicle that the brakes of said first vehicle are applied, a second compartment, a bulb mounted in said second compartment for requesting said driver of said rear vehicle to dim his vehicle's headlights; and a control for operating said headlight dimming signalling bulb, said control being operative only when said bulb in said first compartment is inoperative and having a first operating state wherein said headlight dimming signaling bulb flashes "on and off" and a second state wherein said headlight dimming signaling bulb is inoperative.

20. The headlight dimming signalling system recited in claim 19 further comprising a parabolic reflector mounted in said second compartment to focus the light rays from said headlight dimming signalling bulb.

21. The headlight dimming signalling system recited in claim 19 wherein said housing is mounted in the interior of said vehicle on a package tray.

22. The headlight dimming signalling system recited in claim 19 wherein said housing is mounted on the exterior of said vehicle on a body panel.

23. The headlight dimming signalling system recited in claim 19 wherein the signal from said headlight dimming signalling light in said first operating state emits a flashing blue light.

24. The headlight dimming signalling system recited in claim 19 wherein the signal from said headlight dimming signalling light in said first operating state emits a flashing green light.

25. The headlight dimming signalling system recited in claim 24 wherein said headlight dimming signalling light is mounted on said vehicle at an elevation which is substantially the eye level of the driver of said rear vehicle.

26. The headlight dimming signalling system recited in claim 19 wherein said control for operating said headlight dimming signalling bulb is responsive to a beam of light from said rear vehicle.

* * * * *

UNITED STATES PATENT AND TRADEMARK OFFICE
CERTIFICATE OF CORRECTION

PATENT NO. : 5,113,175
DATED : May 12, 1992
INVENTOR(S) : Robert Adell

It is certified that error appears in the above-identified patent and that said Letters Patent is hereby corrected as shown below:

Column 5, line 40, change "in operative" to --inoperative--

Column 7, line 17, change "B" to --8--

Column 7, line 34, change "si" to --is--

Column 7, line 44, change "headlights" to --headlight--

Column 7, line 53, change "o" to --of--

Column 7, line 53, change "a" to --at--

Signed and Sealed this

Sixth Day of July, 1993

Attest:

MICHAEL K. KIRK

*Attesting Officer*  *Acting Commissioner of Patents and Trademarks*